United States Patent Office 2,842,866
Patented July 15, 1958

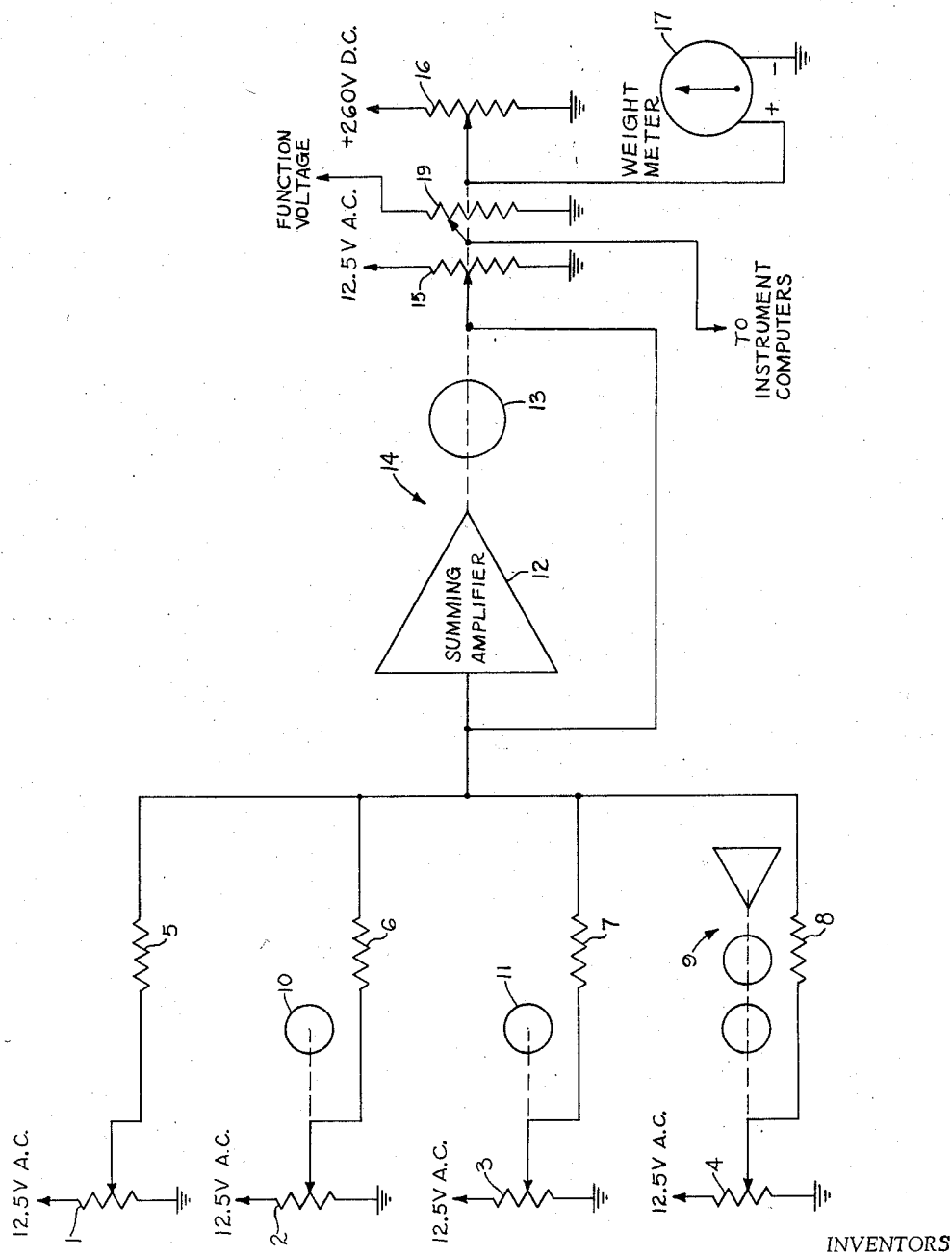

2,842,866

GROSS WEIGHT SYSTEM FOR FLIGHT TRAINER

Robert G. Stern, Caldwell, and Thomas Courtenay Wakefield, Denville, N. J., assignors, by mesne assignments, to the United States of America as represented by the Secretary of the Navy Application October 24, 1952, Serial No. 316,817

6 Claims. (Cl. 35—12)

This invention bears reference to training apparatus designed to confront student pilots with conditions which simulate to an utmost degree those that occur during the flight of an actual aircraft in order to expedite proficiency in learning the behavior patterns of an experienced pilot. More specifically, the aircraft trainer is equipped with controls similar to those of the aircraft which effect variations in the instruments on both the pilot's instrument panel as well as on an instructor's bench. These controls are manipulated by the student pilot and consequently he can predict and anticipate changes in instrument readings caused by such manipulation. However, other effects which also may vary instrument readings may not be under sufficient control of the student pilot to enable him to benefit from anticipation. One such effect is the change of simulated aircraft gross weight as produced by depletion of fuel or discharge of ammunition, loading of equipment, wing icing, etc., in contingencies frequently unpredictable by the pilot. In the event of change of simulated aircraft gross weight due to such influences, the change is apparent from the pilot's instrument panel as well as in the feel of the controls which changes in accordance with the dynamic unbalance of the trainer. In the maintenance of safe flight the importance of recognizing a cause of such unbalance can hardly be overestimated and one of the features of good aircraft trainer design is to provide for the presentation to the student pilot of the problem of reacting to the altered behavior of the trainer caused by changes in its simulated gross weight.

An examination of the prior art will testify that it has been the practice heretofore to actuate the pilot's instruments of a flight trainer in accordance with changes in simulated gross weight through employment of motors operating in conjunction with mechanical equipment. An example of a disclosure of such a system is Patent Number 2,584,261, issued February 5, 1951, to R. C. Davis, et al.

It is the general object of the invention herein disclosed to present equipment and circuitry illustrating an improved method of providing, in a flight trainer, visual indications of change of simulated aircraft gross weight as caused by expenditure of fuel and ammunition, initial loading and wing icing.

A further object of this invention is to provide a simulated gross weight change circuit responsive to control from the flight trainer instructor's position whereby the instructor at will may, within predetermined limits, introduce a change in gross weight of the aircraft simulated by the trainer and subsequently observe the effect on the student pilot and his reaction thereto.

A still further feature of this invention is the electronic control equipment which serves as a coupling link with the computers whose function it is to receive signals representing information from the engine systems, flight controls, trouble panel, etc., analyze them, combine and alter them according to the aerodynamic characteristics of the aircraft simulated, then transmit the resultant signals to the proper flight and engine instruments, flight controls, indicating lights, recording units, etc., of the trainer.

Other objects and many of the attendant advantages of this invention will be readily appreciated as the same becomes better understood by reference to the following detailed description when considered in connection with the accompanying drawing wherein the gross weight section of a flight trainer is depicted as illustrative of one embodiment of the invention herein disclosed. In the drawing, four of the factors which influence simulated gross weight are shown as small alternating control voltages directed to the input network of the summing amplifier of the simulated gross weight servo system 14. These factors are as follows:

(a) The instructor's weight change control 1, located at the instructor's desk of the flight trainer, and by which he can, in setting up a flight problem for the pilot trainee, esablish within limits the initial weight of the simulated aircraft.

(b) An inboard gun control 2, the arm of which is positioned in accordance with the rotation of inboard gun motor 10.

(c) An outboard gun control 3, the arm of which is positioned in accordance with the rotation of outboard gun motor 11.

(d) A fuel depletion control 4, the arm of which is varied in accordance with the rotation of the fuel depletion servo 9 which in turn is actuated by the fuel system of the trainer.

In the embodiment shown, each of the potentiometers 1, 2, 3 and 4 is supplied with an A. C. voltage, part of which is tapped off by the respective arms and used as control potential for the input network of summing amplifier 12 in the gross weight servo system 14. Additionally, since each of these inputs simulates a weight, in order to represent a change in gross weight in proportion to the relative effects of the factors in the actual aircraft, fixed resistors 5, 6, 7 and 8, each valued in accordance with this relative effect, are included serially between the inputs and summing amplifier 12. Summing amplifier 12 of gross weight servo system 14 combines the instantaneous voltages from inputs 1, 2, 3 and 4, amplifies the resultant and converts it to power to drive synchro motor 13, rotation of the shaft of which represents the net effect on simulated gross weight produced by the four factors. The output shaft of synchro motor 13 is mechanically connected to the arms of potentiometers 15, 16 and 19. Potentiometer 15 varies the A. C. voltage in the "answer" circuit of the servo system. The voltage controlled by potentiometer 19 is routed to the instrument computers of the trainer as well as to any computers employed in determining the loading of the trainer controls. The arm of potentiometer 16 functions to provide driving voltage for a gross weight indicator meter 17 located at the instructor's desk.

It is of course apparent that other effects which might influence gross weight of an aircraft may be simulated and introduced in a similar manner but their inclusion is not considered essential to the disclosure.

Obviously many modifications and variations of the present invention are possible in the light of the above teachings. It is therefore to be understood that within the scope of the appended claims the invention may be practiced otherwise than as specifically described.

What is claimed is:

1. In a flight trainer, a system for simulating alteration in the gross weight of the aircraft simulated comprising a plurality of alternating voltage inputs representing analogs of predetermined gross weight components, a plurality of potentiometers coupled to said inputs, a summing amplifier actuated by said potentiometers, a meter, and a servo system applying the output of said summing amplifier to said meter.

2. In a flight trainer, a system for simulating alterations in the gross weight of the aircraft simulated comprising a source of alternating current potential, first alternating potential varying means coupled to said source to simulate a first discrete weight, second potential varying means in parallel with said first means and coupled to said source to simulate a second discrete weight, a summing amplifier fed by said first and second means to add such potentials, a meter, and a servo motor applying the output of said summing amplifier to said meter to indicate the gross weight simulated.

3. The combination of claim 2 wherein said first and second potential varying means comprise potentiometers.

4. In a flight trainer, a system to simulate the instantaneous gross weight of an aircraft comprising a plurality of potentiometers, a servo system applying an alternating potential representing an analog of fuel supply weight to one of said potentiometers, a servo motor, a summing amplifier coupling said potentiometers and said servo motor, and a meter driven by said servo motor to indicate the simulated instantaneous gross weight of the flight trainer.

5. In a flight trainer, a system to simulate continuously the instantaneous gross weight of an aircraft comprising a source of alternating potential, a first, second and third potentiometer each coupled to said source and each having a wiper arm, means to move said arm of said first potentiometer to generate a potential representing the initial weight of the aircraft simulated, motor means to move said arm of said second potentiometer to generate a potential representing the loss of weight of the aircraft due to depletion of ammunition, servo means to move said arm of said third potentiometer to generate a potential representing the loss of weight of the aircraft due to fuel consumption, a summing amplifier fed by said potentiometers, an indicating meter, and a servo motor coupling the output of said summing amplifier and said meter.

6. In a flight trainer, a system for simulating alteration in gross weight of an aircraft comprising, in combination: means providing a plurality of variable input potentials, each representing a different component in the gross weight of an aircraft; a plurality of means for weighting said input potentials in accordance with a predetermined relationship, each said weighting means being connected in circuit with a different one of said input potentials to provide a weighted input potential; a servo system including an amplifier and a motor having an output shaft, said amplifier being adapted to additively combine said weighted input potentials, the latter being applied to said amplifier, the resultant output of said amplifier being applied to said motor and determining the rotational position of the shaft of said motor; and indicating means coupled to said output shaft of said motor to indicate the rotational position of said shaft which, in turn, corresponds to the gross weight of said aircraft.

References Cited in the file of this patent
UNITED STATES PATENTS

| | | |
|---|---|---|
| 2,470,468 | Buchanan | May 17, 1949 |
| 2,491,335 | Rich | Dec. 31, 1949 |
| 2,529,468 | Dehmel | Nov. 7, 1950 |
| 2,541,429 | Mathes et al. | Feb. 13, 1951 |
| 2,584,261 | Davis et al. | Feb. 5, 1952 |
| 2,628,434 | Dehmel | Feb. 17, 1953 |